May 8, 1923.

C. O. STROM

MACHINE FOR CASING IN BOOKS

Filed Dec. 27, 1920 7 Sheets-Sheet 1

1,454,299

Inventor
Clifton O. Strom

May 8, 1923.

C. O. STROM

MACHINE FOR CASING IN BOOKS

Filed Dec. 27, 1920

C. O. STROM

MACHINE FOR CASING IN BOOKS

Filed Dec. 27, 1920

Inventor
Clifton O. Strom

By Young & Young
Attorney

Witness
T. P. Britt

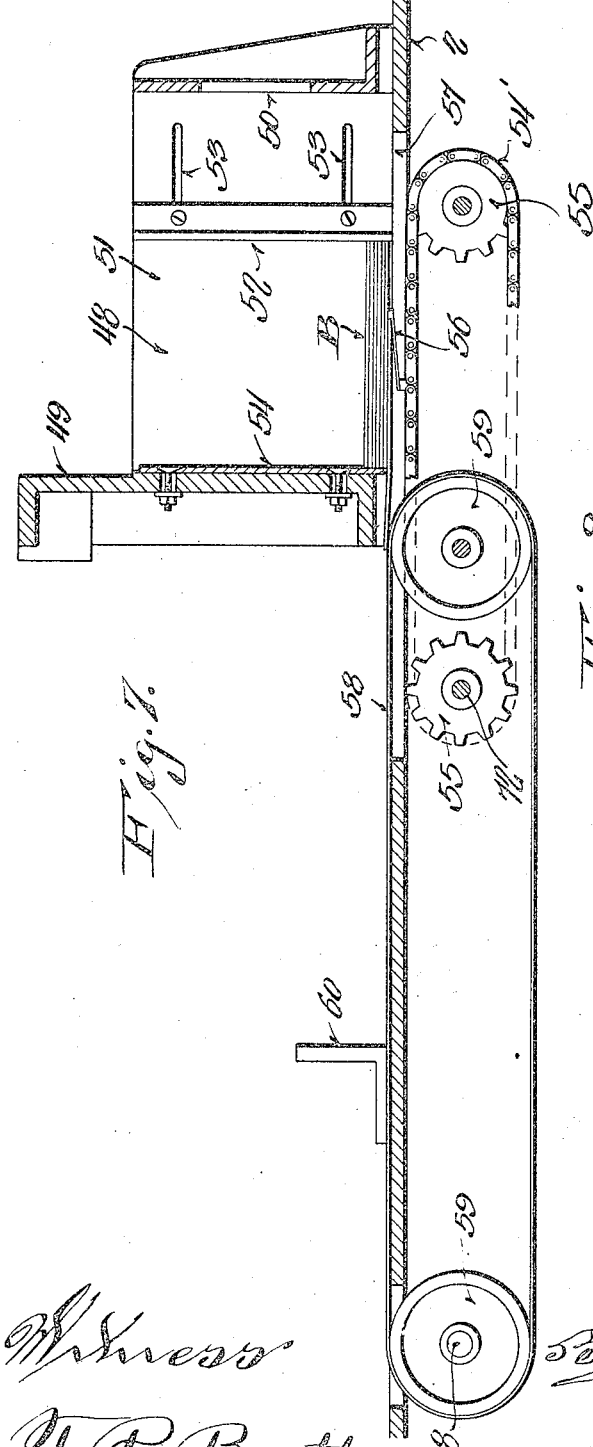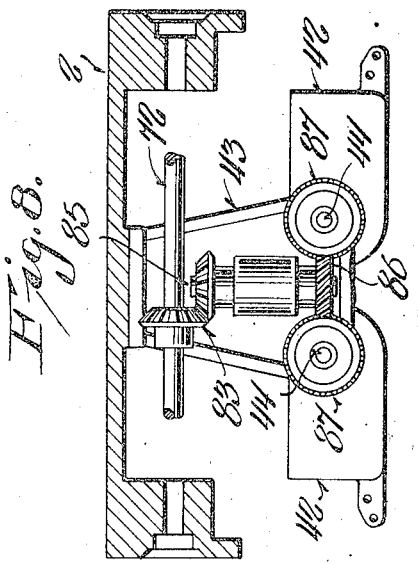

Patented May 8, 1923.

1,454,299

UNITED STATES PATENT OFFICE.

CLIFTON O. STROM, OF RACINE, WISCONSIN, ASSIGNOR TO NELSON BROS. & STROM SALES CO., OF RACINE, WISCONSIN, A CORPORATION OF WISCONSIN.

MACHINE FOR CASING IN BOOKS.

Application filed December 27, 1920. Serial No. 433,409.

*To all whom it may concern:*

Be it known that I, CLIFTON O. STROM, a citizen of the United States, and resident of Racine, in the county of Racine and State of Wisconsin, have invented certain new and useful Improvements in Machines for Casing In Books; and I do hereby declare that the following is a full, clear, and exact description thereof.

This invention relates to improvements in machines for casing in books, and more particularly to a machine for assembling and gluing book fillers into their covers.

It is in general the object of my invention to simplify and otherwise improve the structure of a machine of this character, particularly with reference to increasing the capacity thereof and eliminating a great portion of manual labor generally necessary to machines of this character.

A more detailed object resides in the provision of a novel arrangement whereby the various conveyors operate continuously in one direction instead of reciprocating, thus greatly increasing the capacity of the machine.

A still further object lies in the provision of automatic feeds for the different parts, which go to make up a completed book, thereby eliminating the necessity of operators to feed the machine manually.

With the above and other objects in view, which will be apparent as the description proceeds, my invention resides in the novel features of construction, combination and arrangement of parts, which will be hereinafter more particularly described and defined in the appended claims:

In the drawings:

Figure 7 is a detail sectional view through the book cover magazine and feeding mechanism, as indicated by the line 7—7 of Figure 2, and Figure 8 is a detail sectional view, illustrating the roller driving mechanism.

Figure 4:
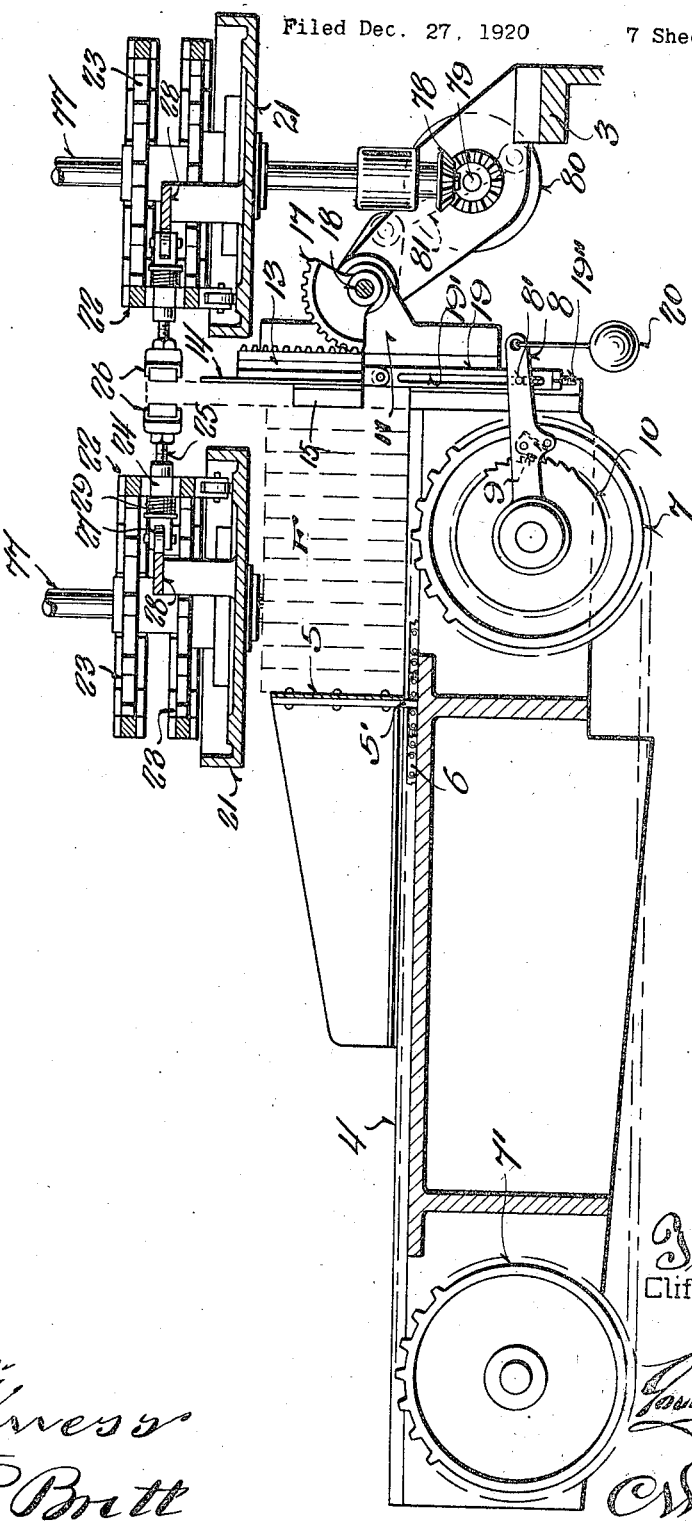
Figure 4 is an enlarged transverse sectional view, taken through the filler feeding mechanism and its associate parts, as indicated by the line 4—4 of Figure 1.
Figure 5:
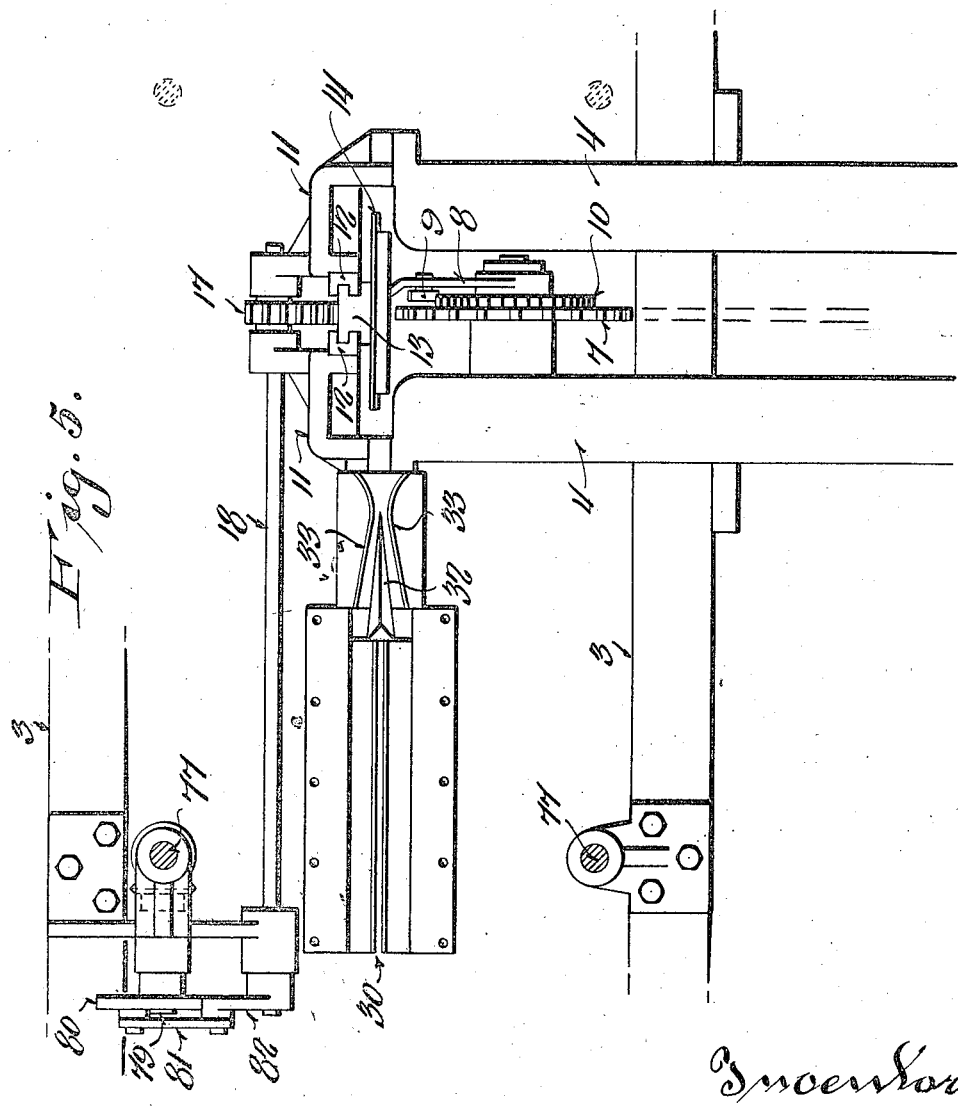
Figure 5 is a sectional plan view, illustrating particularly the filler retaining saddle, taken upon the plane indicated by the line 5—5 of Figure 1.

The present invention has been designed to handle an inexpensive grade of books, which, due to their cheapness in price, must be turned out in large quantities at a small cost for labor. The final operation upon books of this character is the gluing and assembling of the fillers, which come to the machine stitched or otherwise secured together, into a stiff cover. The preferred form of machine for accomplishing this operation is disclosed in the accompanying drawings, in which the numeral 1 designates a frame provided with an upper bed plate 2 and cross struts 3. Extending laterally from the side of the machine are a pair of supporting brackets 4 adapted to hold the book fillers F, as indicated by dotted lines in Figure 4. Slidably mounted upon the brackets 4 is a follower 5 provided with a lug 5' adapted to engage in any desired link of a chain 6, positioned centrally of the brackets 4 and running over the sprockets 7 and 7' carried by shafts mounted in said brackets. As best shown in Figures 4 and 5, the chain 6 is driven by means of the lever 8 and pawl 9 pivoted thereto, the pawl being adapted to engage and drive, intermittently in one direction, a ratchet wheel 10 secured to the gear 7.

Mounted at the inner end of the supporting brackets 4 are a pair of brackets 11 that carry the grooved guides 12, in which a filler elevating block 13 is reciprocatively mounted. Secured to that surface of the block 13 adjacent the filler supporting brackets is an abutment plate 14, against which the fillers are held by the follower 5, while the lower end of the plate 14 is provided with a block 15 adapted to engage and elevate a single filler, upon upward movement of the block 13. The opposite surface of the elevating block 13 is provided with a rack 16, which is engaged by the tooth segment 17 mounted on the oscillatory shaft 18. Depending from the block 13 is a pivoted link 19 provided with a slot 19', into which extends a pin 8' carried by the lever 8. The lower end of the link 19 is provided with a set screw 19″ adapted to regulate the amount of movement transmitted to the lever 8 upon its idle stroke, which, in turn, regulates through the associated mechanism the distance of feed of the follower 5. The downward or working stroke of the lever 8 is obtained by a weight 20 secured to its extreme end.

Figure 1:
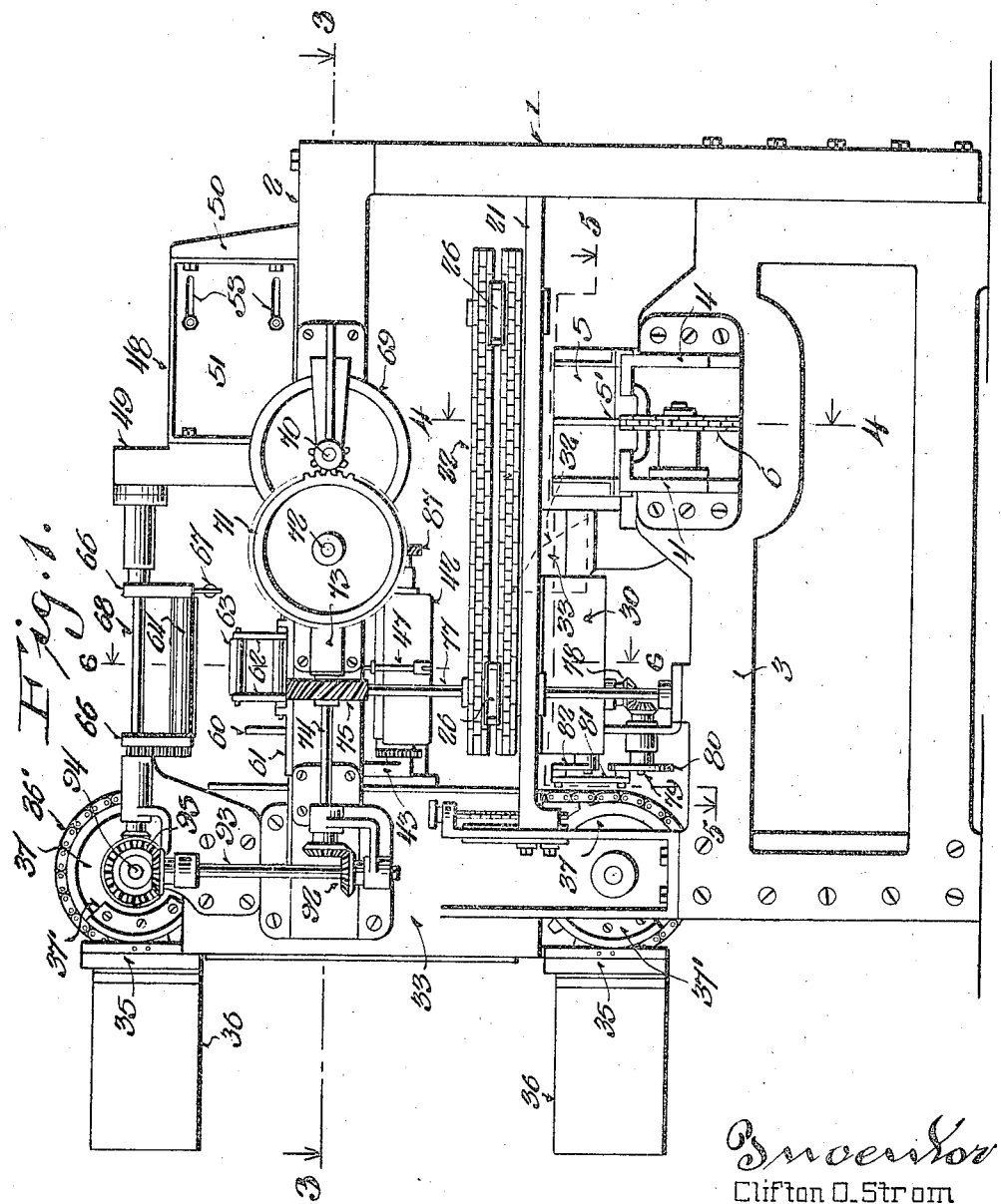
Figure 1 represents a side elevation of a gluing and assembling machine, embodying the features of my invention.
Figure 2:
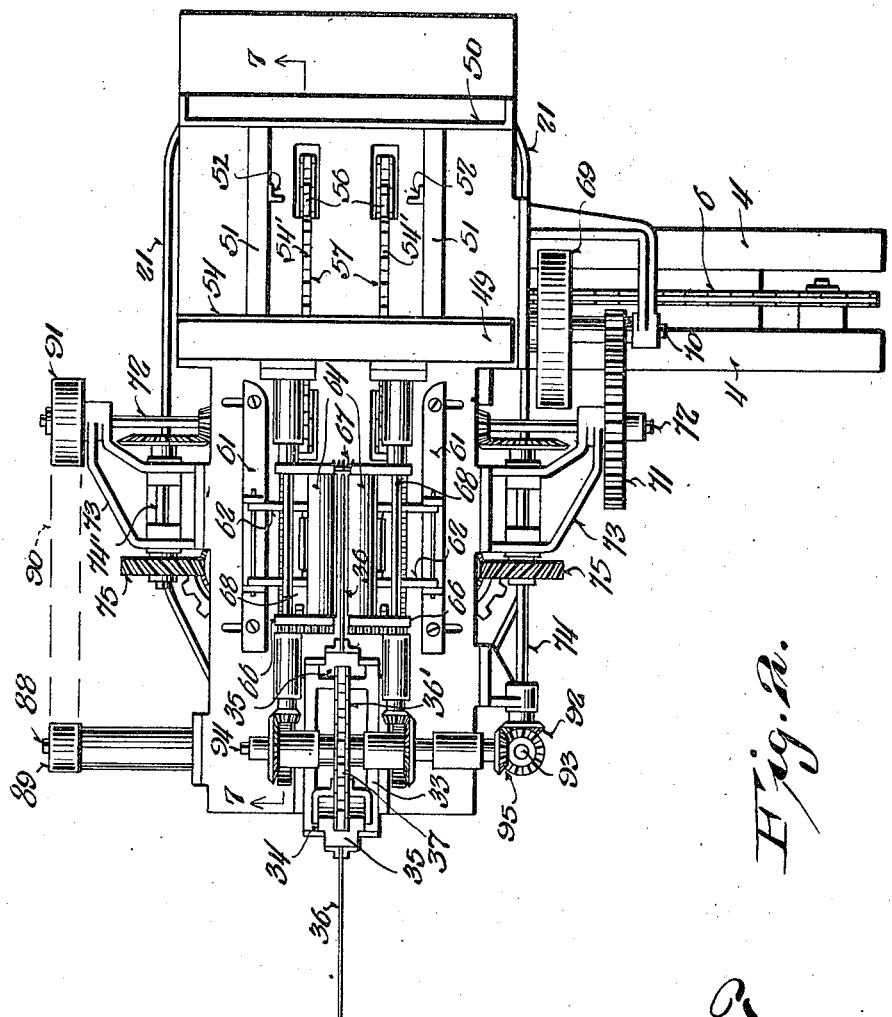
Figure 2 is a plan view of the machine.
Figure 3:
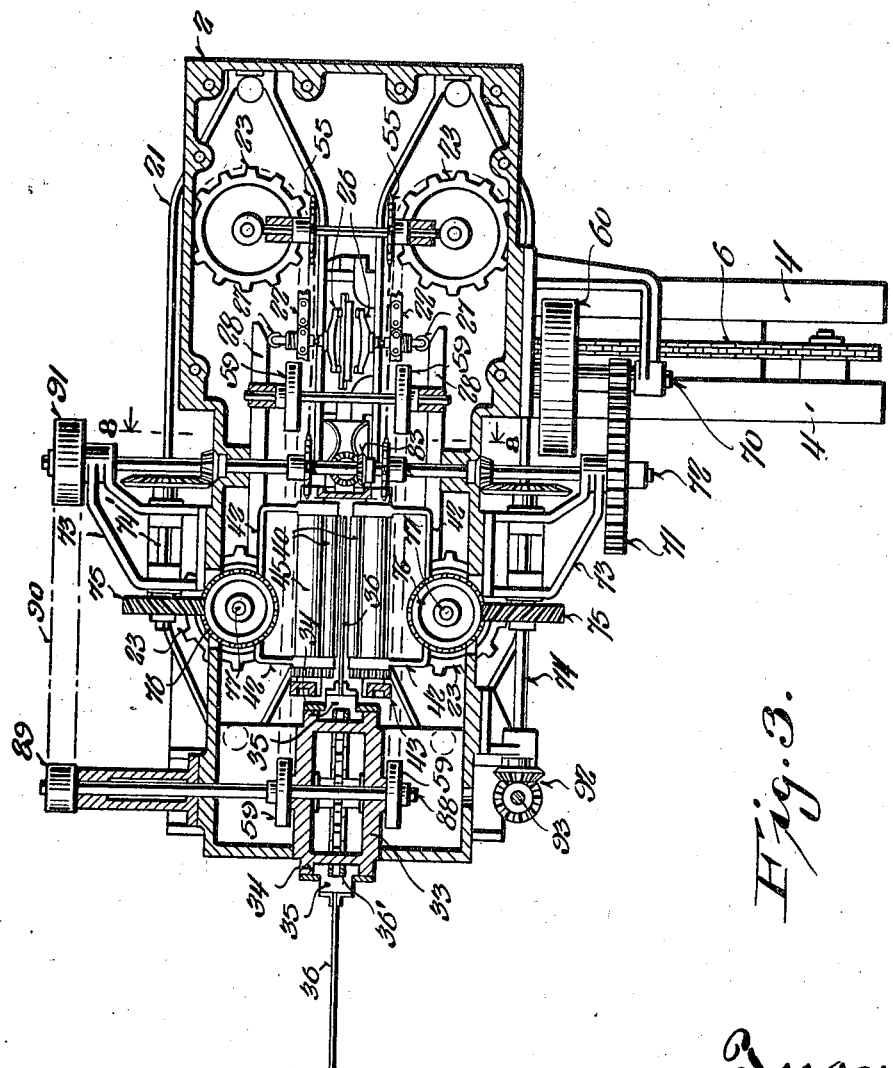
Figure 3 is a sectional view, taken upon the plane indicated by the line 3—3 of Figure 1.

Situated between the filler feeding mechanism and the bed plate 2 are a pair of spaced adjustable tables 21 that support the mechanism for conveying the fillers to the elevating conveyor, which will be later described. This conveyor mechanism comprises two sets of chain carriers 22 traveling over sprockets 23. The chain carriers 22 comprise separate endless chains connected by a plurality of blocks 24, in which are slidably mounted studs 25, having secured to their outer ends spring engaging fingers 26 while their inner ends are provided with rollers 27 adapted to engage, during a portion of their travel, the cam tracks 28 mounted upon the tables 21. Disposed between the blocks 24 and the inner ends of the studs 25 are springs 29 adapted to normally urge the opposing sets of fingers 26 apart. When the fingers 26 are carried forward upon their working stretch, the cams 28 are so positioned that the rollers 27, of the opposing fingers 26, will be engaged, thereby forcing the fingers to grip and convey the elevated filler to a predetermined point, where the rollers leave the cam track and cause the fingers to release the filler. This operation is best illustrated in Figures 3 and 6 of the drawings.

Positioned within the path of travel of the filler, as it is carried forward by the fingers 26, is a saddle 30 comprising two spaced vertical plates provided with upwardly extending portions at their lower ends, which portions are secured to the spaced tables 21 at their adjacent edges. Mounted adjacent the forward end of the saddle and secured to one of the brackets 4′ is a tapered dividing knife 32 adapted to split the filler, in order that the same will straddle the saddle as it is carried forward. In order to insure an approximate equal division of the leaves of a filler, guides 33 are positioned at the sides of the dividing knife to form a throat at the apex of the knife of approximately the same width as the filler.

Mounted at the discharge end of the machine and forming that part of a frame between the bed plate 2 and cross struts 3 is the vertical guide 33 provided with grooved ways 34, in which travel the flange blocks 35 having secured thereto carrier plates 36. The blocks 35 are attached to an endless vertical chain conveyor 36′ that travels over sprockets 37 mounted upon shafts journalled at the upper and lower ends of the guide 33. Mounted upon the opposite sides of the sprockets 37 are flanged sectors 37′ adapted to engage and form a backing for the flanged blocks 38, as they travel over the sprocket wheels. Thus it will be seen that at all times the blocks 35, which are secured to the carrier plates 36, are firmly held in proper alignment, which is most desirable during their working stretch, or that part of their travel in which they are conveying the filler from the saddle to the point of discharge.

Figure 6:
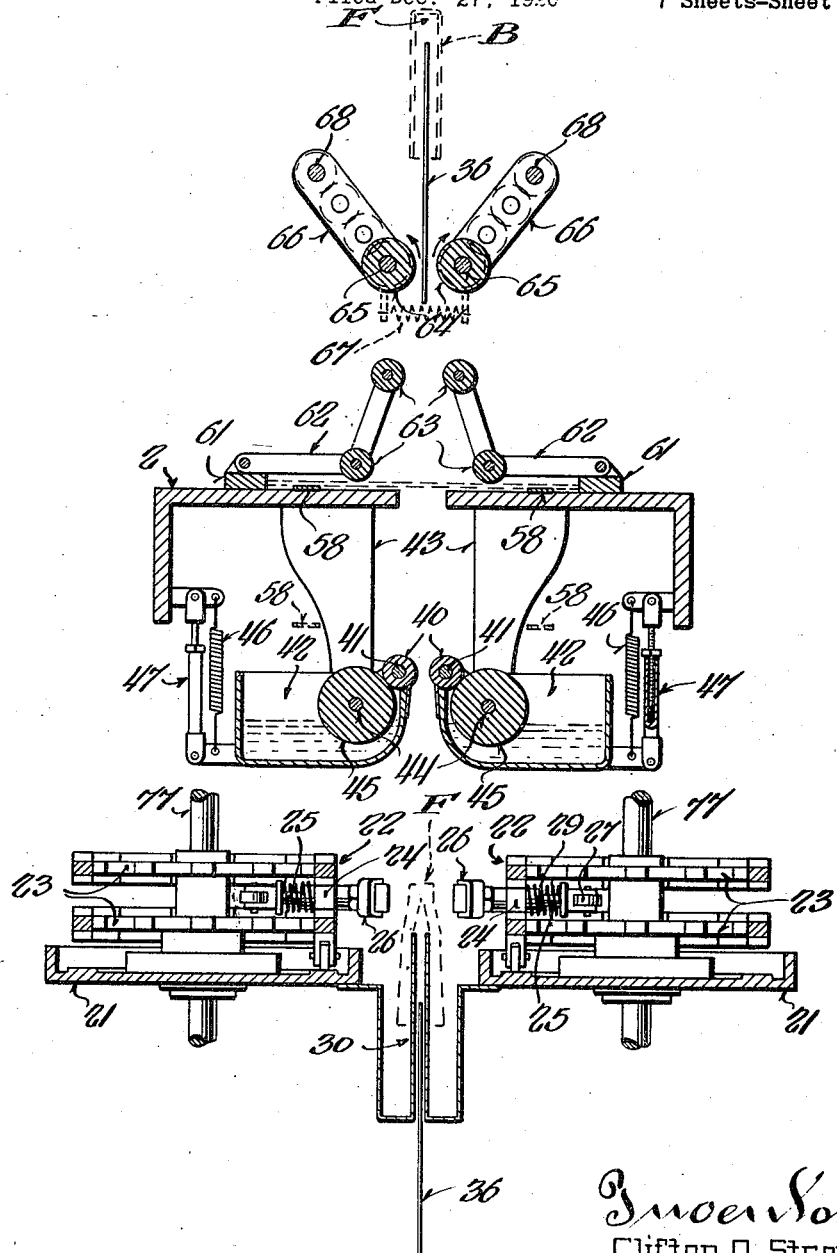
Figure 6 is a transverse sectional view through the machine, taken upon the line 6—6 of Figure 1.

As best shown in Figure 6, when the carrier plates travel upward, they pass through the spaced plates of the saddle 30 and engage between the leaves of the filler which has been carried forward and straddles the saddle, as indicated in dotted lines. The filler is then conveyed upwardly to a pair of spaced driven glue rollers 40 mounted upon the shafts 41 that are journalled in glue pots 42. Depending from the bed plate 2 are spaced brackets 43, in which are journalled shafts 44 that form a pivotal mounting for the glue pots 42. Within the glue pots are rollers 45 that transmit glue to the rollers 40. Attached to arms extending from the bed plates 2, and glue pots, are contractile springs 46 adapted to form a resilient connection to hold the glue pots in their normal position, which position is regulated by means of stops 47 comprising two telescoping members, one of which is threaded and provided with an adjustable nut to limit their telescoping movement. The stops 47 are connected to the same arms projecting from the bed plates and glue pots that carry the springs 46 and enable the relative position of the glue rolls 40 to be regulated for different thicknesses of filler. This connection permits the rollers 40 to move apart as the filler passes therethrough, and at the same time yieldably holds the gluing rollers in contact with the filler and insures a thorough coating of glue thereon.

Mounted on the bed plate 2 at one end of the machine is a magazine 48 adapted to hold the book covers and permit them to be fed singly to that part of the machine, where they are assembled and glued to the fillers. The magazine consists of a stationary front wall 49, a back wall 50, and the adjustable sides 51. Adjustably secured to the inner surface of the sides 51 are angle iron guides 52 having their connecting bolts secured in the slots 53. The sides 51 are also adjustable with relation to the front and back by means of their slotting connection. This permits the magazine to be adjusted to any desired cover within a certain limit. Within the maximum width of a book cover, the bottom of the stationary front 49 is spaced above the table, while adjustably secured to the front wall is a plate 54 adapted to restrict this space to the desired thickness of book cover to be fed from the magazine. Mounted adjacent the underside of the bed plate are a pair of endless feed chains 54′ that travel over sprockets 55. Secured to the chains 54' are spring pawls 56 that extend through the slots 57 from the bed plate 2, and engage one edge of the lowermost book cover in the magazine and feed the same forward to a pair of tape conveyors 58 running over pulleys 59 and along the top surface of the bed plate 2. When the covers come in contact with the stops 60, which are adjustably mounted upon the bed plate, they are held in this position to receive the filler being conveyed upward upon one of the carrier plates 36.

Adjustably mounted upon the bed plate 2 by means of slotted connections are a pair of brackets 61, in which are pivotally mounted the links 62 that carry guide rolls 63. As the cover is engaged by the filler and fed upwardly through the guide rollers, the same cause the sides of the book to be bent downwardly over the sides of the filler, at which point the assembled filler and cover are engaged by a pair of pressure rollers 64 mounted upon shafts 65 journalled in the pivotal brackets 66, which brackets are urged together by a spring 67 connecting their lower adjacent ends. The rollers 64 are caused to rotate, through the medium of suitable geared connections to the shaft 94, in the same direction and at the same speed as the travel of the carrier plates 36. The brackets 66 are mounted upon a pair of driven shafts 68 that are journalled in bearings secured to the guide 33, and the magazine front wall 49. The shafts 68 are provided with pinions which, through a set of idler gears carried by the brackets, drive pinions mounted upon the shafts 65, thereby imparting movement to the pressure rollers 64.

Taking up the driving connections for the various parts of the machine; power is transmitted to a belt pulley 69, mounted upon the shaft 70, which shaft also carries a pinion engaging the gear 71 fast to one end of the shaft 72 which is journalled in the bed plate 2 and extends horizontally through the machine. Fastened at the sides of the bed plate 2 are brackets 73, in which are journalled shafts 74 and 74', which shafts are in bevel gear connection with the shaft 72, and are provided with spiral gears 75 that mesh with gears 76 mounted on the vertical shafts 77. Splined upon the shafts 77 in order that they might be adjusted with the tables 21 are one set of the sprocket gears 23 that drive the conveyors 22. The extreme lower end of one of the vertical shafts 77 is provided with a bevel gear 78 for driving the stub shaft 79, on which is mounted a crank wheel 80, connected by a link 81 to the rocker arm 82 secured to one end of the shaft 18. Through this connection it will be seen that oscillatory movement is transmitted to the shaft 18, which shaft carries the tooth sector 17 for reciprocating the elevating block 13, causing the fillers to be fed to the conveyor 22. As shown in Figures 3 and 8, a bevel pinion 83 is mounted upon the shaft 72 for engaging and driving the stub shaft 85 journalled in one of the brackets 43. The lower end of the shaft 45 is provided with a spiral pinion 86 meshing with the pinions 87 mounted upon the shafts 44, which carry the rollers 45. The drive for the conveyor chains 54' is provided through one set of the sprocket gears 56, which are also mounted upon the shaft 72.

Journalled in and extending transversely through the vertical guide 33 between the stretches of the conveyor chain 36 is a shaft 88, on which are mounted one set of rollers 59 which drive the tape conveyor 58. The shaft 88 is extended at one side of the machine to carry a belt pulley 89, that is connected by means of a belt 90 to the pulley 91 fast on the shaft 72. The shaft 74, through a pair of beveled gears 92, transmits power to the vertical shaft 93. which in turn is in beveled gear connection with the shaft 94. Journalled in the vertical guide 33 and upon the shaft 94 is mounted one of the sprocket wheels 37 that carries the vertical conveyor chain 36. Secured on the shaft 94 upon opposite sides of the sprocket wheel 37 are beveled pinions 95 adapted to drive the shafts 68, upon which are mounted the brackets that carry the idler gears through which power is transmitted to the pressure rollers 64 journalled therein. The operation is as follows:

A number of the fillers F are placed upon the brackets 4, after which the follower 5 is positioned thereon and engaged in the chain 6, by means of a lug 5' inserted into one of the links thereof. The follower, together with chain 6, are then moved forward until the fillers abut the plate 14, as indicated in Figure 4, it being understood that because of the ratchet feed the link chain 6 is free to be moved in that direction. A desired number of covers B are then placed in the magazine 48 and power applied to the machine, which will cause the block 13 to be elevated, whereupon it engages one of the fillers, elevating it to a position where the spring fingers 26 of the conveyor 22 grip it and feed it forward, during which operation its leaves are divided by the tapered knife to enable it to straddle the saddle 30, where it is deposited when the gripping fingers 26 release it. The carrier plates 36, in their upward travel, pass between the spaced plates of the saddle and pick up the filler, which is carried through the rollers 40 that apply a coat of glue to its outer surface. Concurrently, with the above operation, the pawl 56 of the conveyor chain 54' engages and feeds one of the covers from the magazine to the conveyor tapes 58 that carry it forward until it is engaged and held in place by the adjustable stops 60, where it is properly aligned and adapted to receive the filler being carried upward upon one of the plates 36. The assembled cover and filler then passes thru the guide rolls 63 which cause the cover to be folded downward into contact with the sides of the filler and held in contact with the same during the upward movement of the assembled book. As the book leaves the guide rolls 63 the same is engaged by the pressure rolls 64 which cause the cover and filler to firmly adhere together.

The completed books are then removed from the carrier plates, either manually, or they can be delivered to any suitable chute or discharge, which is not shown, and forms no part of my present invention.

From the foregoing, it will be seen that a very simple and efficient machine has been devised for this particular purpose. In view of the fact that the different parts, which go to make up the completed book, travel through the machine in a continuous and progressive movement, which movement is so timed that the parts are delivered practically simultaneously at the place of assembling, the capacity and output is increased to a maximum.

While I have shown and described in the accompanying drawings and specification one embodiment of the present invention, it is understood that various changes in detail of construction are contemplated as within the invention and the present invention shall, in no way, be limited to the specific showing and description contained herein.

I claim:

1. A book gluing and assembling machine comprising a saddle, means for conveying fillers to the saddle, a set of spaced glue rolls, means for automatically feeding covers into alignment to receive the fillers, means for conveying the fillers from the saddle and through the gluing rolls to engage the covers and pressure rolls for pressing the covers to the fillers.

2. A book gluing and assembling machine comprising a split saddle, means for conveying fillers to the saddle, spaced glue rollers, means for feeding covers into alignment to receive the fillers, means adapted to pass through the saddle and convey the fillers therefrom through the glue rolls to the covers, and means for pressing the covers to the fillers.

3. A book gluing and assembling machine comprising an automatic filler feed, a saddle, means for conveying the fillers from the feeding means to the saddle, a set of spaced glue rolls, means for conveying the fillers from the saddle and through the glue rolls, means for feeding covers into alignment to receive the fillers, and means for adhering the covers to the fillers.

4. A book gluing and assembling machine comprising a saddle, means for conveying fillers to the saddle, means for automatically feeding fillers to the conveyor, means for feeding covers into alignment to receive the fillers, means for gluing said fillers within the covers, and means for assembling the fillers and covers.

5. A book gluing and assembling machine comprising a saddle, means for conveying fillers to the saddle, means for automatically feeding fillers to the conveyor, means for feeding covers into alignment to receive said fillers, means for gluing said fillers, means for conveying the fillers from the saddle through said gluing means, and means for pressing the covers upon said fillers.

6. A book gluing and assembling machine comprising a saddle, consisting of spaced plates, a conveyor for delivering fillers to the saddle, means adapted to divide the filler whereby the same will straddle the saddle, a vertical conveyor provided with carrier plates adapted to pass through the saddle to remove the fillers therefrom, means for feeding covers into alignment to receive the fillers as they are carried upon said plates, and means for gluing the covers upon the fillers.

7. A book gluing and assembling machine comprising an automatic filler feed, a split saddle, means for conveying the fillers from the feed mechanism to the saddle, a pair of yieldable spaced glue rolls positioned above said saddle, a conveyor adapted to remove the fillers from the saddle, and carry them through the glue rolls, means for feeding covers into alignment with the fillers as they come from the glue rolls, and pressure rolls adapted to press the covers to the fillers as they are conveyed therethrough.

8. A book gluing and assembling machine comprising a saddle, means for conveying fillers to the saddle, said means comprising spaced endless conveyor chains provided with gripping fingers adapted to engage the fillers, means for automatically feeding covers into alignment to receive the fillers, and means for conveying the fillers from the saddle to engage the covers.

9. A book gluing and assembling machine comprising a filler feeding mechanism consisting of an endless chain provided with a gravity feed, a follower attached to said chain adapted to engage and feed the fillers, means for receiving and elevating the fillers from said feeding mechanism, a saddle, a conveyor adapted to engage the elevated filler and deposit the same upon the saddle, means for feeding book covers into alignment to receive the fillers, and means for conveying the fillers to the covers.

10. A machine for applying covers to books comprising a feeding conveyor for the books, a wedge-shaped book opening device, means to remove the books one at a time from said conveyor and position them on said device, a pair of adhesive applying members, a pair of pressure applying members positioned over said first mentioned members, means to position successively covers for the books intermediate said first and second mentioned members, an endless member adapted to travel in a vertical plane, and means on said endless member adapted to pass through said device to pick up the books and to convey them successively between the first mentioned members to apply a film of adhesive to the outside leaves of the books, then into contact with the covers and then between the second mentioned members to press the covers against the outside leaves of the respective books.

11. A machine for applying covers to books comprising a feeding conveyor for the books, a wedge-shaped book opening device, means to remove the books one at a time from said conveyor and to carry them into endwise contact with said device thereby partially opening the books, a pair of adhesive applying members, a pair of pressure applying members, means to position successively covers for the books intermediate said first and second mentioned members, an endless member, and means on said endless member adapted to pick up the books from said device and to convey them successively between the first mentioned members to apply a film of adhesive to the outside leaves of the books, then into contact with the covers and then between the second mentioned members to press the covers against the outside leaves of the respective books.

12. A machine for applying covers to books comprising a feeding conveyor for the books, a wedge-shaped book opening device, means to remove the books one at a time from said conveyor, a pair of endless members, gripping devices on said endless members adapted to carry the books into endwise contact with said device thereby partially opening the books, a pair of adhesive applying members, a pair of pressure applying members, means to position successively covers for the books intermediate said adhesive applying members and said pressure applying members, an endless member, and means on said last mentioned endless member adapted to pass through said device to pick up the books and to convey them successively between said adhesive applying members, then into contact with the covers and then between the pressure applying members for the purpose described.

13. A machine for applying covers to books comprising a feeding conveyor for the books, a substantially horizontally positioned wedge-shaped book opening device, means to remove the books one at a time from said conveyor, a pair of substantially horizontally positioned endless members, gripping devices on said endless members adapted to carry the books into endwise contact with said book opening device thereby partially opening the books, a pair of adhesive applying members, a pair of pressure applying members, means to position successively covers for the books intermediate said adhesive applying members and said pressure applying members, an endless member adapted to travel in a vertical plane, and means on said last mentioned endless member adapted to pass through said device to pick up the books and to convey them successively between said adhesive applying members, then into contact with the covers and then between the pressure applying members for the purpose described.

In testimony that I claim the foregoing I have hereunto set my hand at Racine, in the county of Racine and State of Wisconsin.

CLIFTON O. STROM.